(12) United States Patent
Haider

(10) Patent No.: US 12,716,466 B2
(45) Date of Patent: Aug. 25, 2026

(54) VIBRATION ISOLATOR WITH AN OFF-SET SEISMIC MOUNT

(71) Applicant: Ahmed Haider, Arcadia, CA (US)

(72) Inventor: Ahmed Haider, Arcadia, CA (US)

( * ) Notice: Subject to any disclaimer, the term of this patent is extended or adjusted under 35 U.S.C. 154(b) by 101 days.

(21) Appl. No.: 18/222,921

(22) Filed: Jul. 17, 2023

(65) Prior Publication Data

US 2024/0019015 A1 Jan. 18, 2024

Related U.S. Application Data

(60) Provisional application No. 63/390,119, filed on Jul. 18, 2022.

(51) Int. Cl.
*F16F 15/08* (2006.01)
*F16M 5/00* (2006.01)
*F16M 7/00* (2006.01)

(52) U.S. Cl.
CPC ............ *F16F 15/085* (2013.01); *F16M 5/00* (2013.01); *F16M 7/00* (2013.01); *F16F 2228/08* (2013.01); *F16F 2230/0005* (2013.01); *F16F 2230/0052* (2013.01)

(58) Field of Classification Search
CPC ................ F16F 15/085; F16F 2228/08; F16F 2230/0005; F16F 2230/0052; F16M 5/00; F16M 7/00
See application file for complete search history.

(56) References Cited

U.S. PATENT DOCUMENTS

| | | | | | |
|---|---|---|---|---|---|
| 1,727,609 | A * | 9/1929 | Kramer | B60P 3/222 267/141 |
| 3,154,273 | A * | 10/1964 | Paulsen | F16M 7/00 188/298 |
| 3,545,706 | A * | 12/1970 | Harshman | B60K 5/06 248/604 |
| 3,952,980 | A * | 4/1976 | Von Pragenau | G12B 3/04 248/636 |
| 4,099,696 | A * | 7/1978 | Toome | B63B 49/00 74/5.5 |
| 4,356,992 | A * | 11/1982 | Benkert | F16F 15/067 248/573 |
| 4,753,421 | A * | 6/1988 | Makibayashi | F16F 13/24 180/312 |
| 4,871,150 | A * | 10/1989 | Salver | F16F 13/16 267/140.3 |
| 4,893,797 | A * | 1/1990 | Le Fol | F16F 13/18 180/312 |
| 5,201,155 | A * | 4/1993 | Shimoda | E01D 19/041 248/634 |
| 5,242,147 | A * | 9/1993 | Kemeny | F16F 7/08 267/141.1 |

(Continued)

*Primary Examiner* — Monica E Millner
(74) *Attorney, Agent, or Firm* — AGK Patent & Trademark Law; Philip Y Kim

(57) ABSTRACT

A shock mount includes four guide bolts and two rectangular guide assemblies to control motion. The guide bolts are fixed to a bottom portion and nuts are threaded onto the guide bolts to limit vertical travel of a sprung portion of the shock mount. The rectangular guide assemblies include a vertical guide plates separated from a bracing plate by a rubber sleeve to guide vertical movement of the sprung portion. One embodiment includes a horizontally offset support plate attachable to machinery.

14 Claims, 8 Drawing Sheets

(56) References Cited

U.S. PATENT DOCUMENTS 5,456,047 A * 10/1995 Dorka .................... F16F 7/082 52/167.6
5,595,371 A * 1/1997 Hukuda ................... F16F 3/04 267/221
5,769,340 A * 6/1998 Jean ....................... B02C 2/005 241/300
6,098,702 A * 8/2000 Shadbourne ....... B60H 1/00535 165/81
6,557,896 B1 * 5/2003 Stobart .................. B60P 3/228 105/358
6,722,215 B2 * 4/2004 Caradonna ......... G01R 31/2887 73/866.5
6,729,597 B2 * 5/2004 Cholinski ............ B66B 11/004 248/646
6,739,568 B2 * 5/2004 Whittaker .......... B60N 2/02246 248/562
6,910,671 B1 * 6/2005 Norkus ................. B62D 24/02 248/560
7,028,969 B2 * 4/2006 Meisel ................. F16F 15/046 267/196
7,165,870 B2 * 1/2007 McKenney ............. F21S 8/086 362/369
7,405,500 B2 * 7/2008 Maeda ................ H10P 72/0444 228/4.5
7,757,441 B1 * 7/2010 Whittaker .......... B60N 2/02246 267/248
9,091,322 B2 * 7/2015 Wang ...................... F16M 5/00
D777,015 S * 1/2017 Deveci .......................... D8/349
9,765,847 B1 * 9/2017 Benkert ................ F16F 15/067
12,065,037 B2 * 8/2024 Bristot .................. F16F 1/3849
2003/0071187 A1 * 4/2003 Herren ................ F16F 15/0275 248/638
2003/0205855 A1 * 11/2003 Halladay ................. F16F 13/04 267/140.13
2004/0216398 A1 * 11/2004 Manos ..................... E04B 9/18 52/167.7
2006/0043654 A1 * 3/2006 Allaei ................... F16F 3/0935 267/140.3
2013/0292888 A1 * 11/2013 Hwang ................ B60K 5/1208 267/140.13
2017/0219154 A1 * 8/2017 Achunche ................. F16L 3/16
2018/0216687 A1 * 8/2018 Thompson ................ F16F 1/40

* cited by examiner 30
22
1
2
6
7
9
34
16
16a
10

VIBRATION ISOLATOR WITH AN OFF-SET SEISMIC MOUNT

CROSS-REFERENCE TO RELATED APPLICATIONS

The present application claims the priority of U.S. Provisional Patent Application Ser. No. 63/390,119 filed Jul. 18, 2022, which application is incorporated in its entirety herein by reference.

BACKGROUND OF THE INVENTION

The present invention relates to vibration isolators with seismic mounts and in particular to a height saving off-set shock mount.

Heavy equipment often requires a shock mount to isolate the mounted equipment from local vibrations and shocks, and to isolate other equipment from vibrations and shocks created by the mounted equipment. Known shock mounts may fail to prevent damage to the equipment.

Further, such equipment may be located in facilities where height is critical. Known shock mounts reside under the equipment adding to height and there may not be sufficient space for the shock mounts.

BRIEF SUMMARY OF THE INVENTION

The present invention addresses the above and other needs by providing a shock mount including four guide bolts and two rectangular guide assemblies to control motion. The guide bolts are fixed to a bottom and nuts are threaded onto the guide bolts to limit vertical travel of a sprung portion of the shock mount. The rectangular guide assemblies include a vertical guide plates separated from a bracing plate by a rubber sleeve to guide vertical movement of the sprung portion. One embodiment includes a horizontally offset support plate attachable to machinery.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value. All dimensions are in inches unless otherwise stated.

Figure 2:
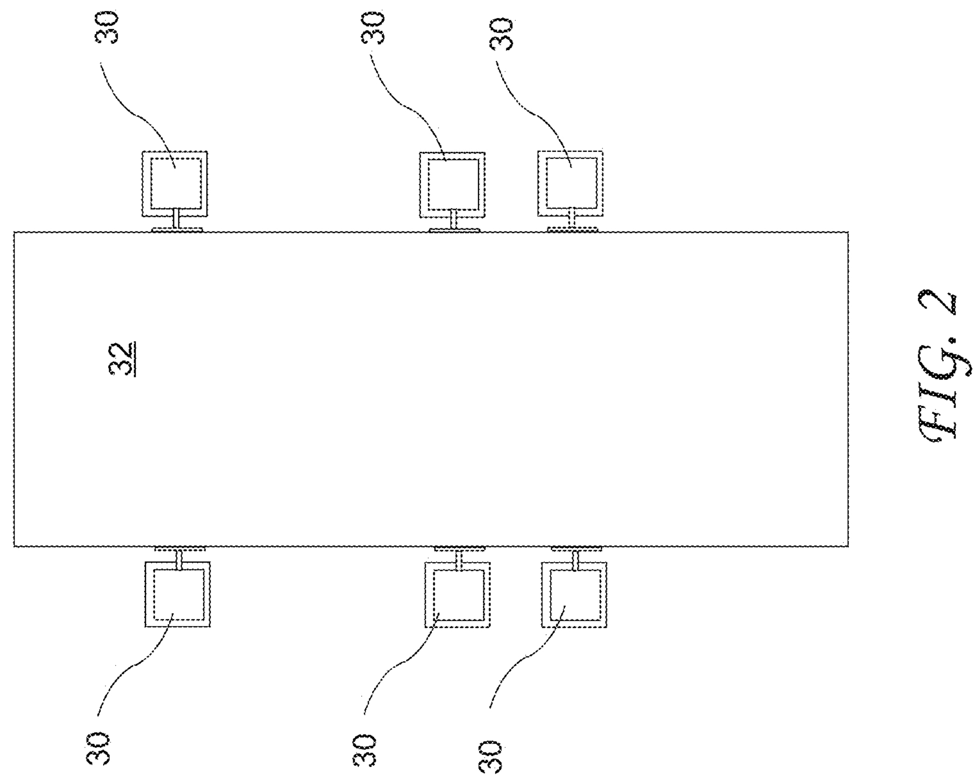
FIG. 2 shows a top view of the set of the shock mounts according to the present invention supporting the machinery.
Figure 1:
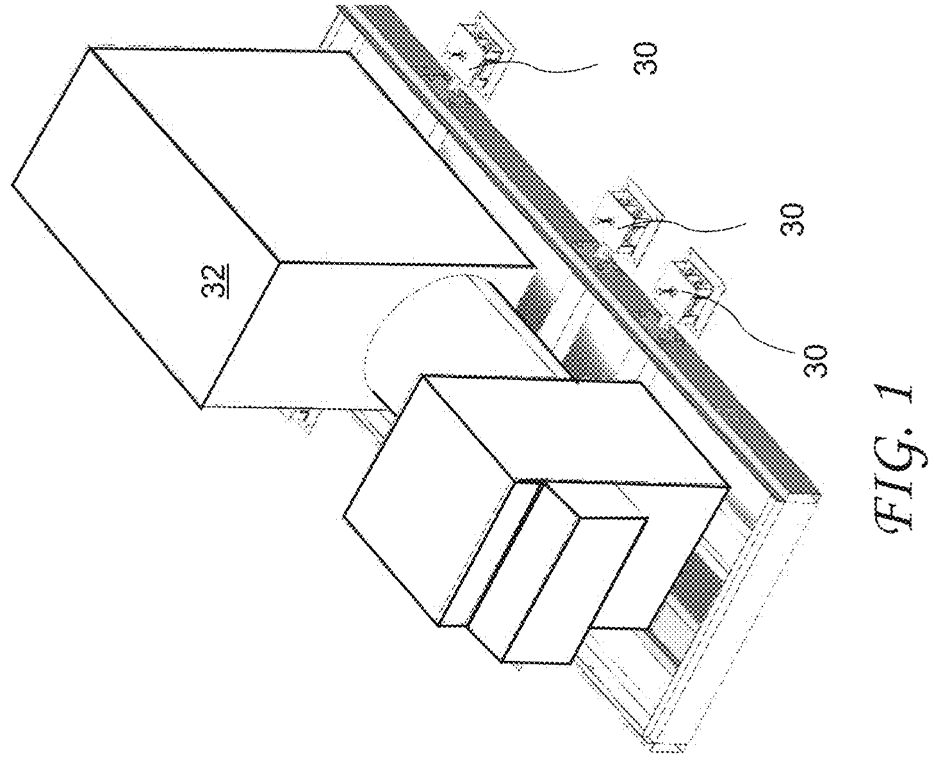
FIG. 1 shows a perspective view of a set of shock mounts according to the present invention supporting machinery.
Figure 4:
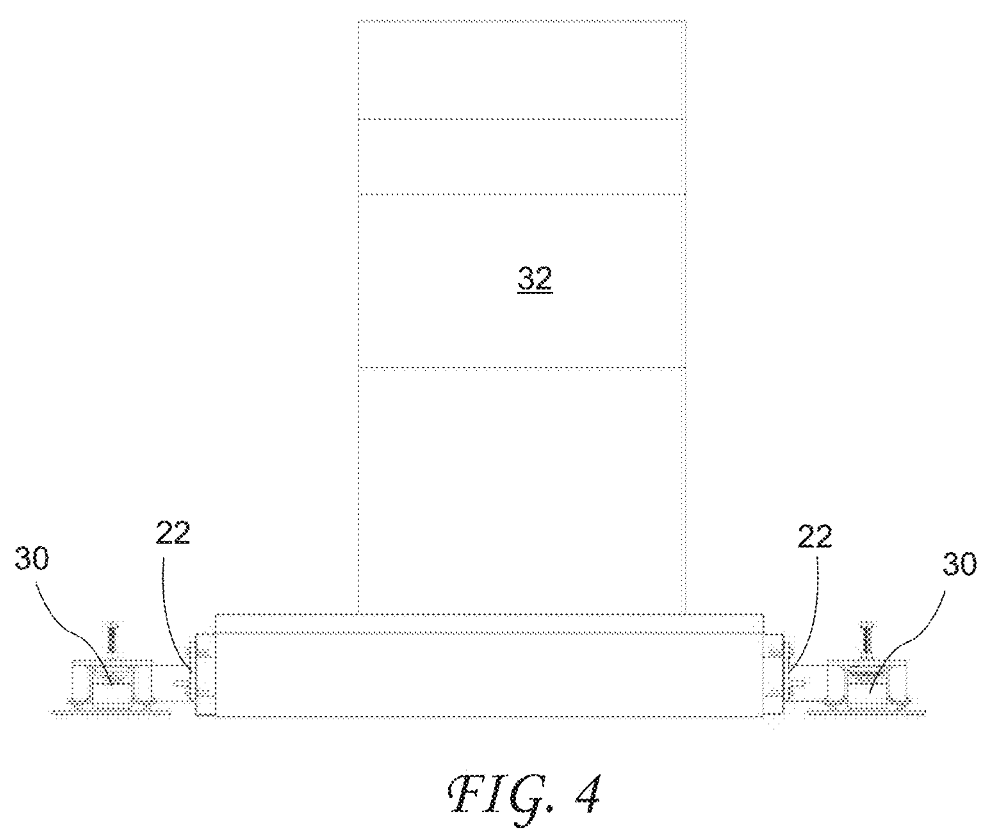
FIG. 4 shows an end view of the shock mounts according to the present invention supporting the machinery.
Figure 3:
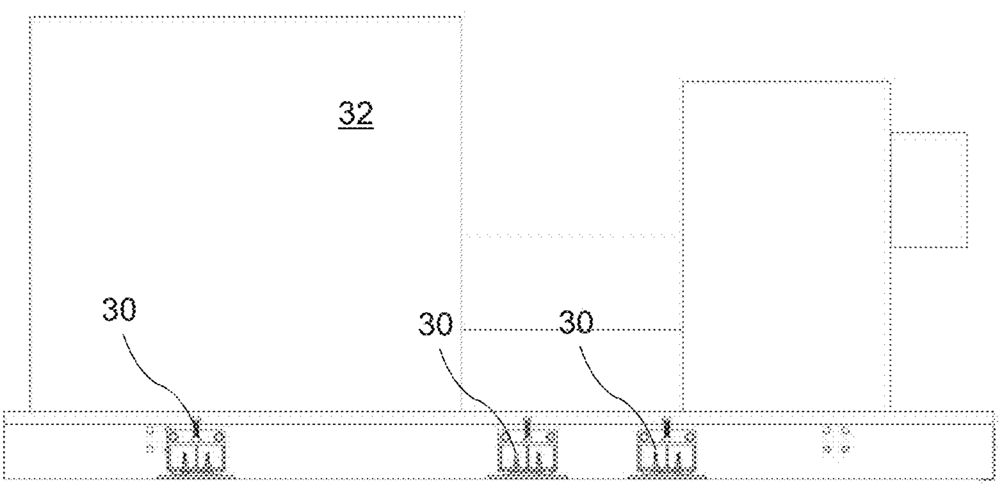
FIG. 3 shows a side view of the shock mounts according to the present invention supporting the machinery.

A perspective view of a set of offset shock mounts 30 according to the present invention supporting a protected structure, for example machinery 32 is shown in FIG. 1, a top view of the set of shock mounts 30 supporting the machinery 32 is shown in FIG. 2, a side view of the set of shock mounts 30 supporting the machinery 32 is shown in FIG. 3, and an end view of the set of shock mounts 30 supporting the machinery 32 is shown in FIG. 4. The shock mounts 30 may include lateral attachment plates 22 (also see FIG. 5) attaching the shock mounts 30 to the machinery 32 using mounting bolts 23.

Figure 5:
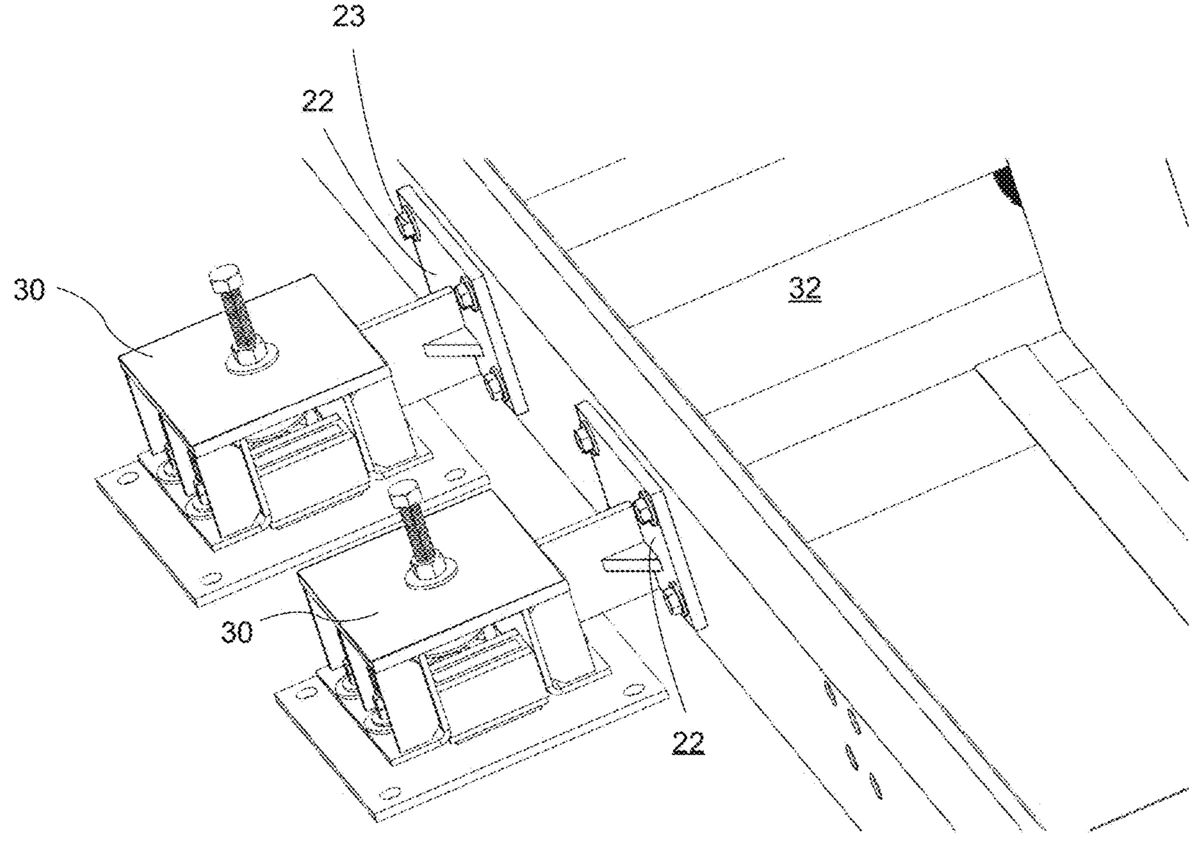
FIG. 5 shows a more detailed of the shock mounts according to the present invention supporting the machinery.

A detailed view of the set of shock mounts 30 supporting the machinery 32 is shown in FIG. 5. The lateral attachment plates 22 do not add height to the supported machinery 32.

Figures 6, 7A, 7B, 7C:
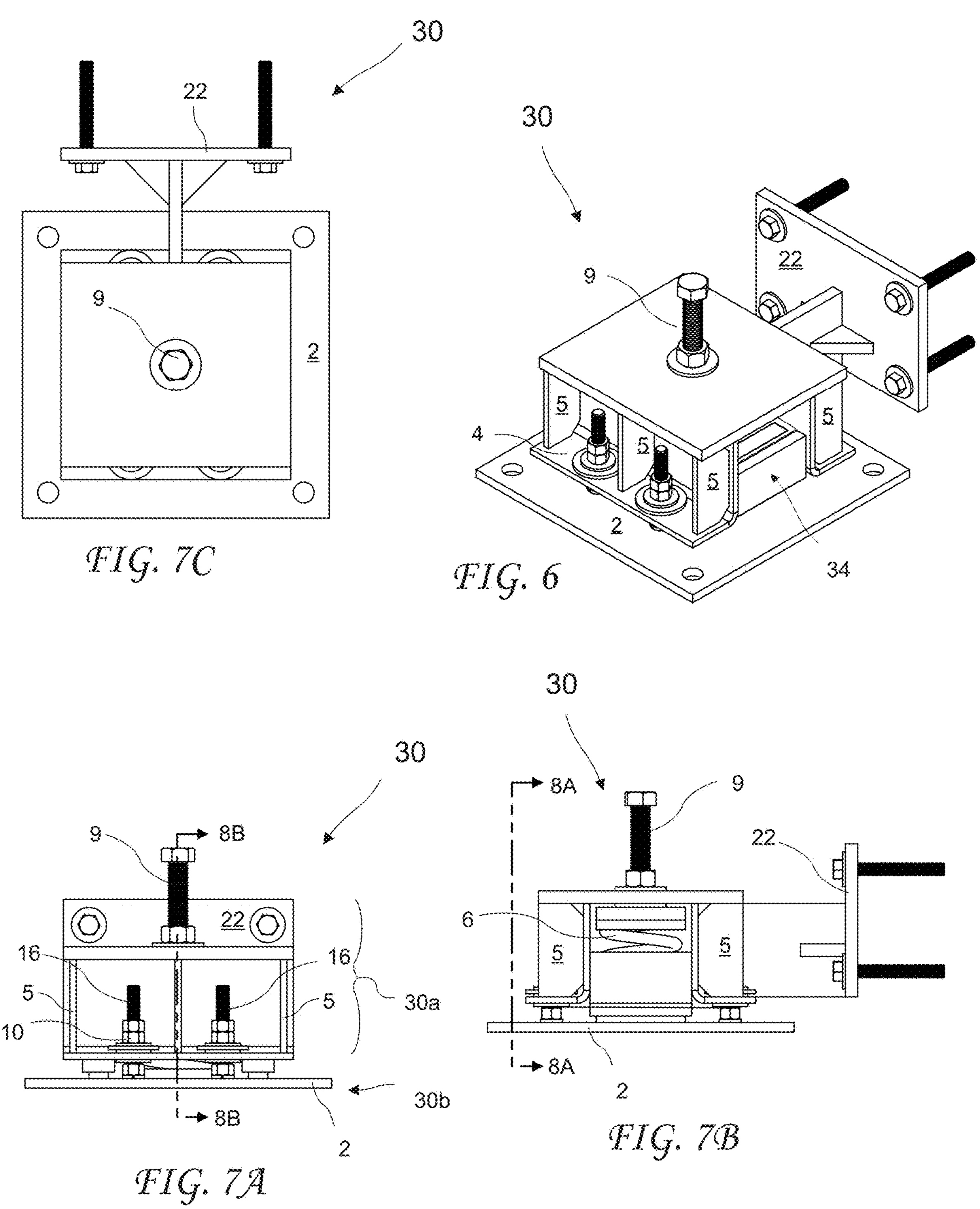
FIG. 6 shows a perspective view of the shock mount according to the present invention.
FIG. 7A shows a front view of the shock mount according to the present invention.
FIG. 7B shows a side view of the shock mount according to the present invention.
FIG. 7C shows a top view of the shock mount according to the present invention.

A perspective view of the shock mount 30 is shown in FIG. 6, a front view of the shock mount 30 is shown in FIG. 7A, a side view of the shock mount 30 is shown in FIG. 7B, and a top view of the shock mount 30 is shown in FIG. 7C. The shock mount 30 includes a sprung portion 30*a* and an unsprung portion 30*b*. A spring 6 resides between the sprung and unsprung portions 30*a* and 30*b* supporting the sprung portion 30*a*. The shock mount 30 further includes a rectangular guide assembly 34 which comprises a bracing plate 11 attached to the bottom plate 2, parallel pairs of guide plates 3 attached to the top plate 1 by L-shaped sides 4 supported by stiffener plates 5, and a rubber sleeve 12 between the guide plates 3 and the bracing plate 11 (see FIG. 12). Guide bolts 16 are fixed to the bottom plate 2 and pass through the L-shaped sides 4 to align the sprung portion 30*a* with the unsprung portion 30*b*. The guide bolts 16 are preferably ½ inch, grade 5, all threaded socket bolts, 13 threads per inch. Pairs of nuts 10 are tightened together onto the guide bolts 16 to limit vertical travel of the sprung portion 30*a* of the shock mount 30. There are at least two guide bolts 16, and preferably three guide bolts 16, and more preferably four guide bolts 16.

Those skilled in the art will recognize that other guide assemblies may be developed, but an offset shock mount with other features of the present invention but including a different guide assembly fails to depart from the scope of the invention set forth in the claims. For example, the pairs of guide plates 3 may be fixed to the unsprung bottom portion 30*b* and the bracing plate 11 may be fixed to the sprung top potion 30*a*.

Figures 8A, 8B, 9, 10:
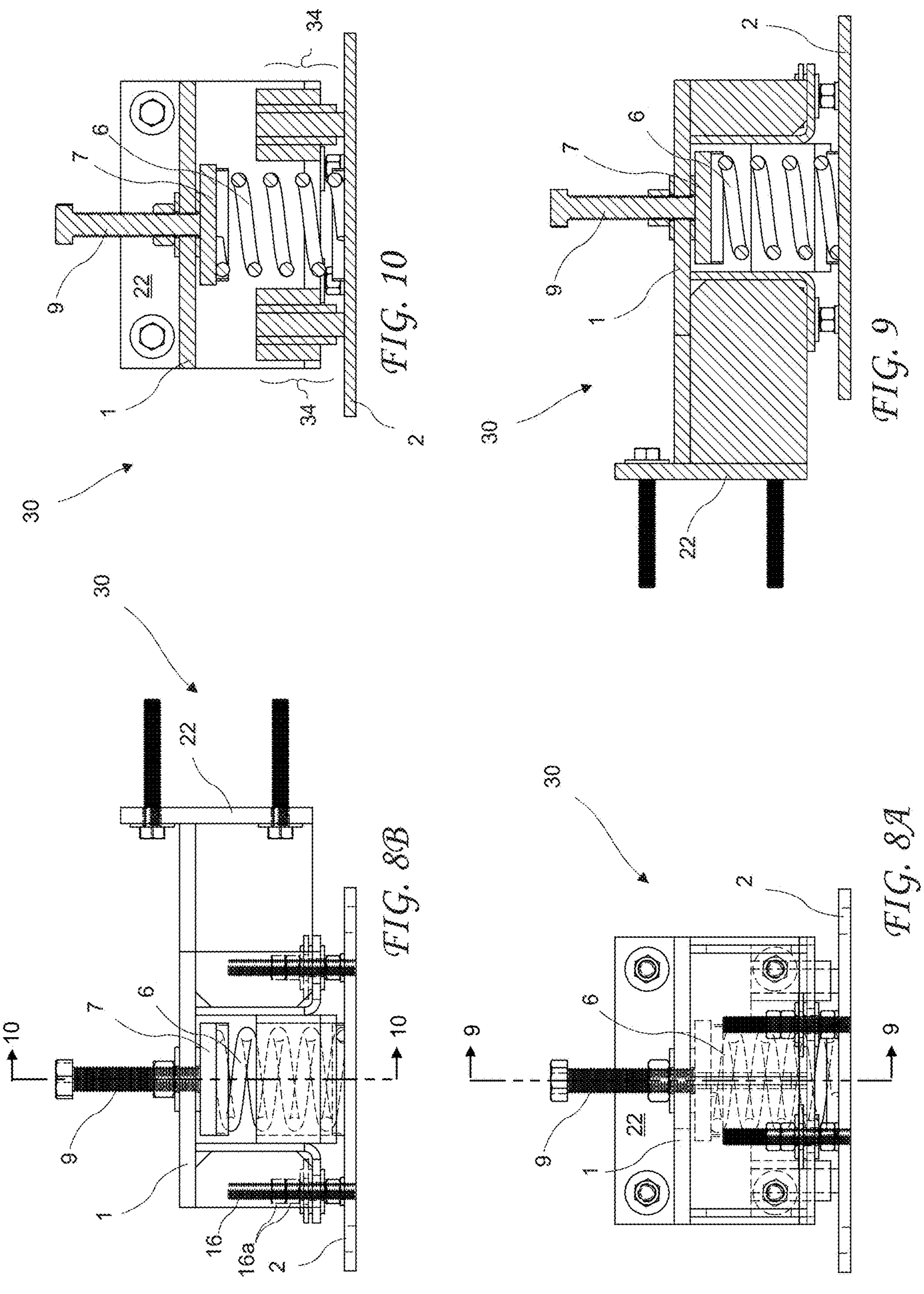
FIG. 8A shows a cross-sectional view of the shock mount according to the present invention taken along line 8A-8A of FIG. 7B.
FIG. 8B shows a cross-sectional view of the shock mount according to the present invention taken along line 8B-8B of FIG. 7A.
FIG. 9 shows a cross-sectional view of the shock mount according to the present invention taken along line 9-9 of FIG. 8A.
FIG. 10 shows a cross-sectional view of the shock mount according to the present invention taken along line 10-10 of FIG. 8B.

A cross-sectional view of the shock mount 30 taken along line 8A-8A of FIG. 7B is shown in FIG. 8A, and a cross-sectional view of the shock mount 30 taken along line 8B-8B of FIG. 7A is shown in FIG. 8B. A bolt 9 extends from the top of the sprung portion 30*a* and reaches through the sprung portion 30*a* to a compression plate 7 residing on top of the spring 6. The bolt 9 may be advanced through the top 1 and against the compression plate 7 to load the spring 6.

A cross-sectional view of the shock mount 30 taken along line 9-9 of FIG. 8A is shown in FIG. 9 and a cross-sectional view of the shock mount 30 taken along line 10-10 of FIG. 8B is shown in FIG. 10. The rectangular guide assemblies 34 guides the top portion 30*a* during vertical travel.

Figure 11:
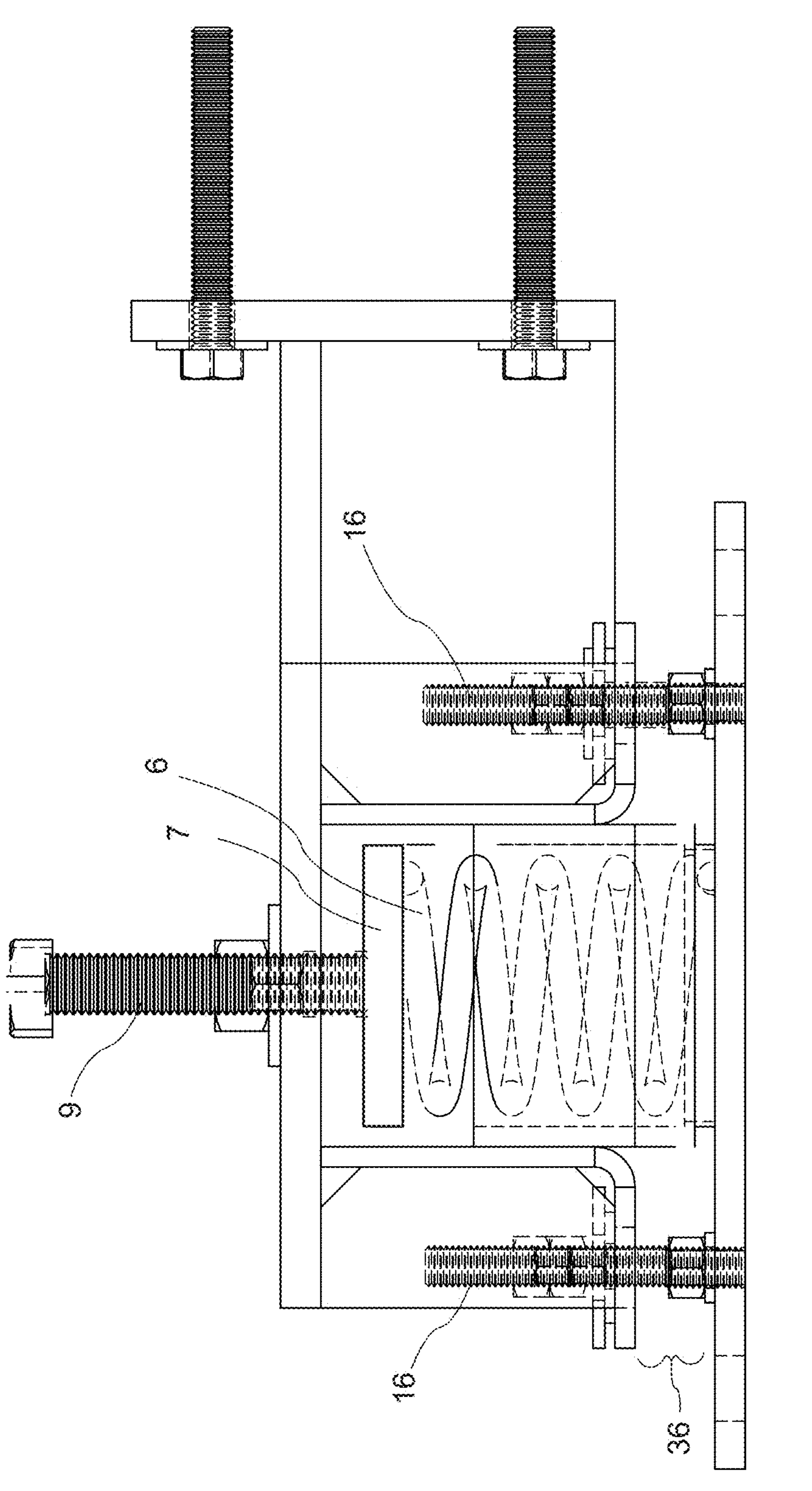
FIG. 11 shows a cross-sectional view of the shock mount according to the present invention taken along line 8B-8B of FIG. 7A with the shock mount pre-loaded to isolate the machinery from shocks.

A cross-sectional view of the shock mount 30 taken along line 8B-8B of FIG. 7A with the shock mount 30 pre-loaded by advancing a pre-load bolt 9 against the compression plate 7 to compress the spring 6 to isolate the machinery 32 from shocks is shown in FIG. 11. The pre-load bolt is preferably a ¾ inch diameter, grade 5, full threaded, 10 thread per inch bolt. A gap 36 is created by pre-loading the spring 6 to allow vertical motion of the sprung portion 30*a*.

Figures 12, 12A:
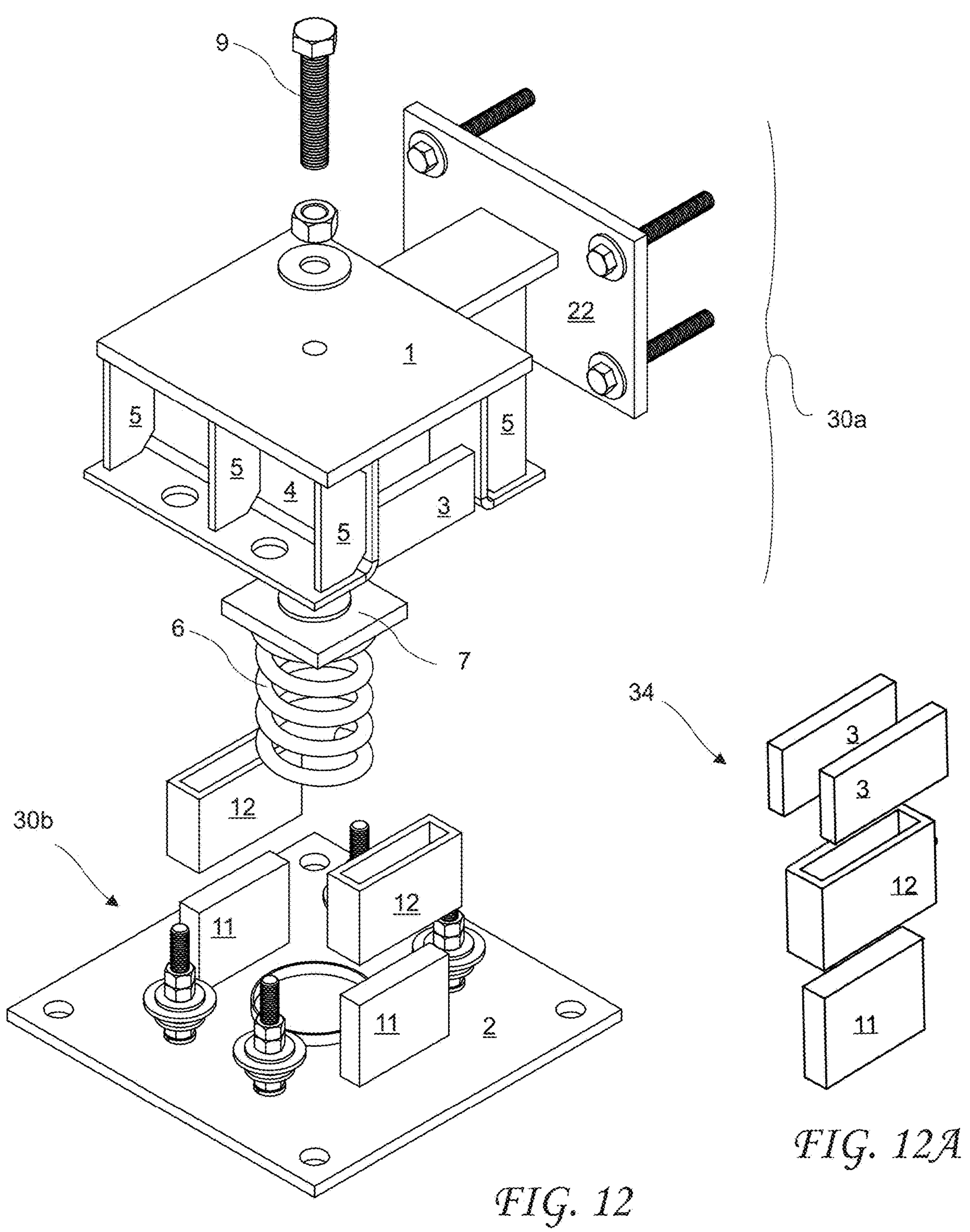
FIG. 12 shows the shock mount according to the present invention separated into a base and an isolated part.
FIG. 12A shows the elements of a rectangular guide assembly of the shock mount according to the present invention.

The shock mount 30 separated into an unsprung portion 30*b* and a sprung portion 30*a* is shown in FIG. 12 and elements of the rectangular guide assemblies 34 are shown in FIG. 12A. The rectangular guide assemblies 34 includes the parallel pairs of guide plates 3 attached to the sprung portion 30*a*, the bracing plate 11 attached to the unsprung portion 30*b*, and the rubber sleeve 12 between the parallel pairs of guide plates 3 and the bracing plate 11.

Figure 13:
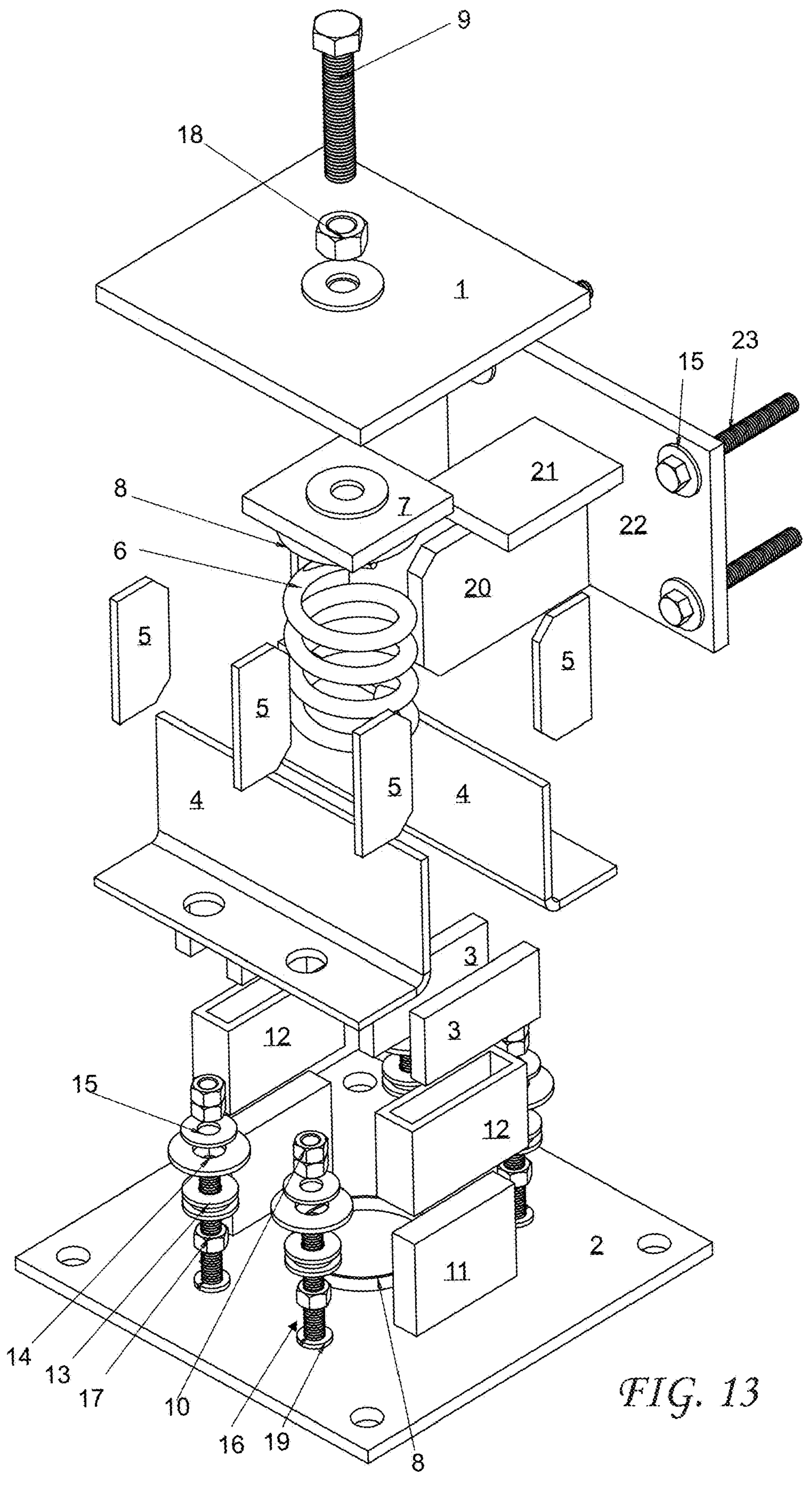
FIG. 13 shows an exploded view of the shock mount according to the present invention.

An exploded view of the shock mount 30 is shown in FIG. 13. The shock mount 30 preferably includes:

1 top plate
2 bottom plate
3 parallel guide plates
4 L-shaped side
5 stiffener plate
6 compression spring
7 compression plate
8 spring seat
9 pre-load bolt
10 nuts
11 bracing plate
12 rubber sleeve
13 bolts neoprene rubber grommet
14 selected narrow fw 0.625
15 preferred narrow fw 0.5
16 guide bolts
17 hnut 0.5000-13-d-n
18 hnut 0.7500-10-b-n
19 regular lock washer 0.5
20 middle stiffener plate
21 top support plate
22 support plate
23 mounting bolts
30 shock mount
30*a* sprung portion
30*b* unsprung portion
32 machinery
34 rectangular guide assembly
36 gap While the invention herein disclosed has been described by means of specific embodiments and applications thereof, numerous modifications and variations could be made thereto by those skilled in the art without departing from the scope of the invention set forth in the claims.

I claim:

1. An off-set shock mount comprising:
an unsprung bottom portion;
a sprung top portion residing above the bottom portion;
a support plate attached to the top portion and configured to laterally attach to a protected structure at a position laterally offset from a vertical axis of the bottom portion;
a spring in compression between the bottom portion and the top portion and supporting the top portion; and
two guide assemblies guiding vertical motion of the sprung portion;
wherein the off-set shock mount is configured to constrain lateral displacement resulting from loading at the laterally offset position.

2. The off-set shock mount of claim 1, further including at least two guide bolts limiting vertical motion of the top portion.

3. The off-set shock mount of claim 2, wherein at least two guide bolts comprise four guide bolts.

4. The off-set shock mount of claim 2, wherein pairs of nuts are tightened together on a top portion of each of the guide bolts to limit the vertical motion of the top portion.

5. The off-set shock mount of claim 1, wherein the two guide assemblies comprise:
vertically upward reaching bracing plates attached to the bottom portion;
vertically downward reaching guide plates attached to the top portion; and
the bracing plates and guide plates overlapping to limit horizontal movement of the top plate.

6. The off-set shock mount of claim 5, wherein the two guide assemblies include sleeves between the bracing plates and guide plates.

7. The off-set shock mount of claim 6, wherein the sleeves are rubber sleeves.

8. The off-set shock mount of claim 5, wherein the guide plates comprise a pair of parallel guide plates and the bracing plate comprise a single bracing plate residing between the pair of parallel guide plates.

9. The off-set shock mount of claim 1, further including a pre-load bolt threadedly engaging the top portion and bearing against the spring to pre-load the spring.

10. An off-set shock mount comprising:
an unsprung bottom portion;
a sprung top portion residing above the bottom portion;
a support plate attached to the top portion and configured to laterally attach to a protected structure at a position laterally offset from a vertical axis of the bottom portion;
a spring in compression between the bottom portion and the top portion and supporting the top portion;

two guide assemblies guiding vertical motion of the sprung portion;

four guide bolts limiting vertical motion of the top portion;

two guide assemblies comprising a pair of parallel guide plates and a single bracing plate residing between the pair of parallel guide plates; and a pre-load bolt threadedly engaging the top portion and bearing against the spring to pre-load the spring;

wherein the off-set shock mount is configured to constrain lateral displacement resulting from loading at the laterally offset position.

11. An off-set shock mount comprising:

an unsprung bottom portion;

a sprung top portion residing above the bottom portion;

a support plate attached to the sprung top portion and configured to laterally attach to a protected structure at a position laterally offset from a vertical axis of the bottom portion;

a spring in compression between the bottom portion and the top portion and supporting the top portion;

a rigid frame attached to the support plate, the rigid frame comprising at least two L-shaped side walls; and at least one stiffener plate connected to the at least two L-shaped side walls, wherein the rigid frame and the at least one stiffener plate are configured to translate the lateral eccentric load from the support plate into a stable vertical force on the spring;

wherein the off-set shock mount is configured to constrain lateral displacement resulting from loading at the laterally offset position.

12. The off-set shock mount of claim 11, further including a guide assembly guiding vertical motion of the sprung top portion.

13. The off-set shock mount of claim 11, further including at least two guide bolts limiting vertical motion of the sprung top portion.

14. The off-set shock mount of claim 11, further including a pre-load bolt threadedly engaging the sprung top portion and bearing against the spring to pre-load the spring.

* * * * *